(12) United States Patent
Fuchs

(10) Patent No.: US 11,274,686 B2
(45) Date of Patent: Mar. 15, 2022

(54) HYDRAULIC COMPONENT

(71) Applicant: Robert Bosch GmbH, Stuttgart (DE)

(72) Inventor: Christoph Fuchs, Neuhofen an der Krems (AT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/927,646

(22) Filed: Jul. 13, 2020

(65) Prior Publication Data

US 2021/0018021 A1   Jan. 21, 2021

(30) Foreign Application Priority Data

Jul. 16, 2019   (DE) ..................... 10 2019 210 451.7

(51) Int. Cl.
*F15B 13/04* (2006.01)
*F15B 1/04* (2006.01)
*F15B 19/00* (2006.01)

(52) U.S. Cl.
CPC .............. *F15B 19/005* (2013.01); *F15B 1/04* (2013.01); *F15B 13/0401* (2013.01); *F15B 2201/50* (2013.01); *F15B 2211/857* (2013.01); *F15B 2211/87* (2013.01)

(58) Field of Classification Search
CPC ................. F15B 19/005; F15B 13/0401; F15B 2201/50; F15B 2211/857; F15B 2211/87
See application file for complete search history.

(56) References Cited

U.S. PATENT DOCUMENTS

2002/0158769 A1* 10/2002 Ikeda ................... B41F 33/0081
340/675
2018/0130222 A1* 5/2018 Tafazoli Bilandi .... G01B 11/04

* cited by examiner

*Primary Examiner* — Michael Leslie
*Assistant Examiner* — Daniel S Collins
(74) *Attorney, Agent, or Firm* — Maginot, Moore & Beck LLP

(57) ABSTRACT

A hydraulic component includes a camera integrated such that the camera observes at least one surface that is prone to wear and/or at least one edge that is prone to wear to make a statement about wear relating to the at least one surface and/or the at least one edge.

20 Claims, 4 Drawing Sheets

HYDRAULIC COMPONENT

This application claims priority under 35 U.S.C. § 119 to patent application number DE 10 2019 210 451.7, filed on Jul. 16, 2019 in Germany, the disclosure of which is incorporated herein by reference in its entirety.

FIELD

The disclosure relates to a hydraulic component.

BACKGROUND

Hydraulic components such as axial piston machines or valves are subject to wear. For example, signs of wear in an axial piston machine can occur for example due to cavitation damage. To discover this damage as early as possible to prevent any unforeseen failures of the hydraulic component, the latter can be monitored. Monitoring the component furthermore makes it possible to better plan maintenance intervals.

Monitoring the hydraulic component includes, for example, measuring the temperature and/or measuring the water content in the hydraulic fluid and/or recording vibrations. Wear of the hydraulic component, for example, can then be inferred from said data. However, measuring said data does not make it possible to determine the precise location at which the hydraulic component has a defect and/or wear. Furthermore, the previously mentioned data that allow wear to be inferred could also be generated, for example, by a further hydraulic component contained in a hydraulic arrangement in which the hydraulic component is contained.

SUMMARY

Against this background, the disclosure is based on the object of creating a cost-effective hydraulic component that is simple in terms of apparatus technology and the state of which, in particular state of wear, is able to be monitored cost-effectively and precisely in a way that is simple in terms of apparatus technology.

This object is achieved according to the features described herein.

Advantageous developments of the disclosure are further described below.

The disclosure provides a hydraulic component into which at least one camera is integrated. Said camera is aimed in particular at a surface that is prone to wear and/or at least one edge that is prone to wear in a manner such that it is/they are observable. In other words, the camera is arranged such that it can be used to observe at least one surface and/or at least one edge. The camera can be integrated in an axial piston machine, for example, and be used to observe, for example, a sliding surface on a cylindrical drum of the axial piston machine.

It is one advantage of the disclosure that, owing to the camera that is aimed at the surface and/or the edge and/or with which the edge and/or surface is observable, a state of wear of said edge and/or of said surface is made visible. In other words, there is no need for a statement about wear to be calculated and/or estimated on the basis of various measured data, but rather the statement about wear can be made reliably and accurately. It is another advantage that the portion and/or a structural part in which or at which wear has occurred is able to be determined by way of the camera. This has the advantage that the defective structural part is already known before the maintenance, i.e. before the hydraulic component is unscrewed and taken apart for maintenance, and the defective structural part can thus be prepared and/or ordered and/or manufactured beforehand. This can save time during a maintenance procedure of the hydraulic component. It is another advantage that there is no need for complicated calculations and/or estimates to make a statement about wear. In other words, computation systems, for example, that determine a statement about wear from the measured data can be dispensed with because it is possible to make the statement about wear using images recorded by the camera. In addition, it is possible in a hydraulic system having, for example, a plurality of said hydraulic components, to directly determine the hydraulic component that is defective and causes, for example, an increase in temperature of a hydraulic fluid. In other words, there is no longer a need to monitor a multiplicity of various operating data to be able to determine which hydraulic component is defective and what that defect is.

The hydraulic component preferably has an evaluation unit and/or is connected to an evaluation unit. The evaluation unit can be used to evaluate the image and/or the images of the camera, as a result of which it is possible to make a statement about wear relating to the surface and/or the edge. In other words, the camera can be connected to the evaluation unit and/or to a server for example via a cable, which can be guided out of the hydraulic component, and/or without cable, for example via Bluetooth or via another cable-free connection technology, so as to allow an exact statement about wear to be made, and/or the server can also be connectable to the evaluation unit in a cable-free manner and/or via a cable. The evaluation unit can be configured for example such that it can make a statement about wear relating to whether the hydraulic component exhibits wear and/or where the hydraulic component exhibits wear and/or how far the wear has progressed. This is advantageous because the statement about wear is consequently very exact, and maintenance can be adapted thereto, for example. In other words, a maintenance interval can be extended for example if the evaluation unit has determined, via the images of the camera, that the hydraulic component exhibits no wear and/or only some wear, rendering maintenance unnecessary.

The evaluation unit can have, for example, a monitor or a display and/or be connected to a monitor or display, and a person can evaluate data via said monitor, for example. The images can be transmitted for example from the camera to a server, in particular a condition monitoring server, and be stored there, and for example a person can subsequently view said images, for example via a screen and/or a display, and in this way make a statement about wear.

In a further exemplary embodiment, the evaluation unit can additionally or alternatively have an automated image evaluation unit. The automated image evaluation unit can establish a state of wear on the basis of image features for example by way of a neural network. In other words, the automated image evaluation can compare for example images of the surface and/or the edge recorded by the camera for example to images and/or to an image of the surface and/or the edge in the non-used state. Using the automated image evaluation unit, the smallest of changes can be ascertained, and the statement about wear can be made with particular accuracy. It is a further advantage that the evaluation can be implemented by the automated image evaluation unit without monitoring by a person, and, if there is wear, the automated image evaluation unit can perform a subsequent step, such as requesting maintenance and/or outputting a wear alert, in an automated manner. In this way, personnel costs can be saved, for example.

In particular, the automated image evaluation unit is based on a neural network, in particular a convolutional neural network (CNN). The neural network is particularly suitable for evaluating images. For this purpose, the neural network can have a setup with different layers. For example, the neural network can consist of one or more convolutional layers, followed by a pooling layer. Said layers can be repeated in particular as often as required, i.e. in particular as often as is necessary for the application in this case. This can be followed by a fully connected layer. It is advantageous to integrate such a neural network in the evaluation unit because said network can also learn independently, for example, and, as a result, the statement about wear becomes more accurate and better over time. Furthermore, complicated initial training of the automated image evaluation unit is thus not necessary or necessary only to a reduced extent.

Furthermore, at least one sensor can additionally be provided. Said sensor can be configured, for example, to determine operating data, such as an ambient temperature and/or a temperature of the hydraulic fluid and/or the air humidity and/or vibrations and/or an oxygen content in the hydraulic fluid and/or a water content in the hydraulic fluid, etc. Additionally or alternatively, a movement speed, for example the number of revolutions per minute in an axial piston machine, can for example also be determined by the sensor. Said operating data can be communicated to the evaluation unit, for example, in particular via the server. The evaluation unit can then make a statement about wear relating to the hydraulic component from the operating data. In other words, in the statement about wear that is made on the basis of the images of the camera, a further statement about wear can be ascertained from the operating data. This is advantageous since it is possible in this way to check the statement about wear. Furthermore, the sensor can be connectable to the evaluation unit preferably via a cable or without cable, and/or the sensor can be connectable to the server via a cable or without cable.

The evaluation unit is furthermore preferably embodied such that it compares the statement about wear that is based on the operating data to the statement about wear that is based on the images. In other words, the evaluation unit compares the two statements about wear in an automated manner to check the statement about wear and to make the statement about wear more accurate and less susceptible to errors. In other words, it is thus possible to more reliably make a statement about wear. For example, an alert notification and/or maintenance due to an incorrect estimation can thus be prevented. This can result in costs being saved in terms of work and material.

The hydraulic component and/or the camera furthermore has at least one light source. In other words, at least one light source is arranged in the hydraulic component, for example in the camera, such that the edge and/or the surface is illuminated. This is advantageous since the images taken by the camera are thus better exposed.

To accommodate the camera and/or the light source, the hydraulic component can have at least one cutout. The cutout can be arranged for example in a connection cover in an axial piston machine.

If the camera is supplied with power from the outside using a cable and/or if the camera is connected to, for example, the server and/or the evaluation unit by a cable, the cutout is preferably a through-hole. The through-hole can in particular have different portions having different diameters, wherein in particular a diameter that is provided for the cable that is being guided through is smaller than a portion for accommodating the camera and/or the light source. In other words, taking an axial piston machine as an example, the camera and/or the light source can in particular be insertable into the through-hole and/or the cutout from a side in a manner such that the through-hole and/or the cutout can be sealed off with respect to the outside particularly simply and easily. For this purpose, the camera and/or the light source can be attached for example in the non-mounted state of the hydraulic component. In summary, the cutout preferably has a larger diameter on the side facing the surface and/or edge to be observed than on the side that is remote therefrom, so that the cutout is easy to seal off with respect to the outside.

At least one computation element that can be integrated into the evaluation unit, for example, is preferably provided. The computation element is preferably configured such that it controls the light source or the camera in dependence on the operating data of the hydraulic component that are determined by the sensor. In particular, the sensor controls the camera and/or the light source in dependence on a movement speed of the hydraulic component. That is to say, the hydraulic component preferably has at least one speed sensor. This is advantageous because the light and the triggering of the camera are thus able to be synchronized with a movement of the hydraulic component. For example, in the case of an axial piston machine, the computation element can control the camera or the light source such that a sliding surface on a cylindrical drum is visible on the image taken by the camera. In other words, the camera is thus able to record only relevant images, and a memory size of the server can thus be reduced, for example. If the camera were triggered independently of a movement sequence of the hydraulic component, a multiplicity of images that would not allow any statement about wear to be made would be generated. These images would then have to be removed for example, which would entail a large amount of effort. It is therefore advantageous that the computation element synchronizes the camera and/or the light source with the movement of the hydraulic component.

If a movement of the hydraulic component is very fast, the light source is preferably a stroboscope. This is advantageous because an image visible to the human eye for example is thus a still image that shows in particular the surface that is prone to wear and/or the edge that is prone to wear.

It is additionally advantageous if the hydraulic component and/or the camera have a transparent element, wherein the element can be a pane, for example. This element can protect the light source and/or the camera against dirt and/or hydraulic fluid. In other words, the element is arranged between the surface and/or edge that is to be photographed and/or recorded and the camera and/or the light source. The element is preferably arranged in the component via sealants and seals off an accommodation space for the camera and/or the light source.

The hydraulic component can furthermore be, for example, a piston accumulator, in which the camera is able to be used for inspecting the inner surface and for detecting leaks, and/or a directional valve, in the case of which the camera is able to be used for detecting wear of the control edges, and/or a control valve in the case of which the camera is able to be used for detecting wear of the control edges, and/or a servo hydraulic axis, and/or a cylinder, in which wear detection of a surface and leak detection is able to be performed by the camera, and/or an assembly, in which the camera is able to be used for detection of foam formation, etc. in the container interior. In other words, the hydraulic component can be a respective hydraulic structural part that has moving parts.

If the hydraulic component is, for example, a directional valve, the camera and/or the light source can be arranged in, for example, a valve body of the directional valve. The camera is then preferably aligned such that a valve slide and/or control edges of the valve are able to be observed with the former.

If the camera is located for example in an axial piston machine, the camera can preferably be arrangeable in a connection cover. For example a sliding surface, in particular a sliding surface on the cylindrical drum, can be observed with the camera. In particular, the camera can be arranged in an additional cutout, for example in an inlet and/or outlet line in the connection cover. If the camera is arranged there, it can for example record the sliding surface through at least one opening in a control plate.

BRIEF DESCRIPTION OF THE DRAWINGS

Preferred exemplary embodiments of the disclosure will be explained in more detail below with reference to schematic drawings, in which.

DETAILED DESCRIPTION

Figure 1:
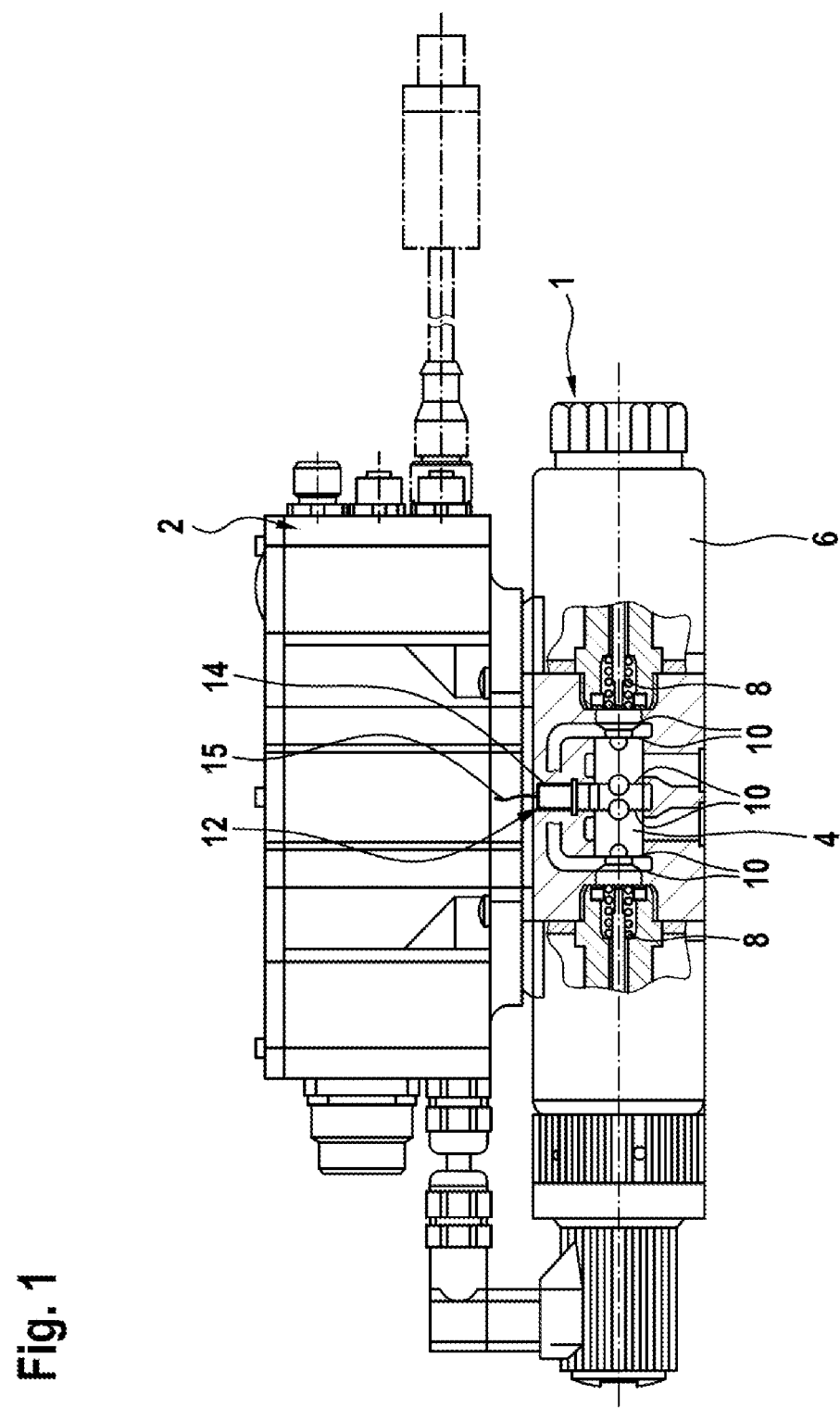
FIG. 1 shows a sectional image of a directional valve with a camera.

FIG. 1 shows a directional valve 1, which is a hydraulic component and additionally has a pilot valve 2. The directional valve 1 has a constantly moveable valve slide 4, which is movable in a valve body 6. Springs 8, which are arranged on both sides of the valve slide 4, are each supported at the valve body 6 and at a respective side of the valve slide 4, so that the valve slide 4 in a non-actuated state is spring-centered in a central position.

The valve slide 4 and the valve body 6 have a multiplicity of control edges 10. These are susceptible to wear. For this reason, monitoring of the control edges 10 can prevent for example the directional valve 1 from becoming defective unexpectedly. A camera 12 is placed into the valve body 6 for monitoring the control edges 10 or at least some of the control edges 10. The camera 12 is arranged such that it can observe the control edges 10. To this end, the valve body 6 has an additional cutout 14 that accommodates the camera 12. The camera 12 is aligned in a radial direction of the valve slide 4. In addition, the cutout 14 can accommodate a cable 15 with which the camera 12 is connectable for example to a computation unit and/or an evaluation unit.

To accommodate the camera 12, the cutout 14 can be, for example, a through-hole extending through the valve body 6 and with a somewhat larger diameter than the camera 12, so that the latter is arrangeable from the outside through the cutout 14 and is aimed at the control edges 10. The cutout 14 can in this case be sealed off, for example on the side facing the control edges 10, with a sealant, with the result that no hydraulic fluid can exit. The cutout 14 can furthermore have diameters of various sizes, wherein the cutout 14 has, on the side facing the control edges 10, a diameter that is large enough to allow the camera 12 to be accommodated therein. The diameter of a part of the cutout 14 through which the cable 15 is able to be guided preferably has a smaller diameter, with the result that the cutout 14 can be easily sealed off with respect to the outside. If the cutout 14 has a smaller diameter on the side that is remote from the control edges 10, the camera 12 can be inserted through a hole, for example, in which the valve slide 4 is arranged in the mounted state.

Figure 2:
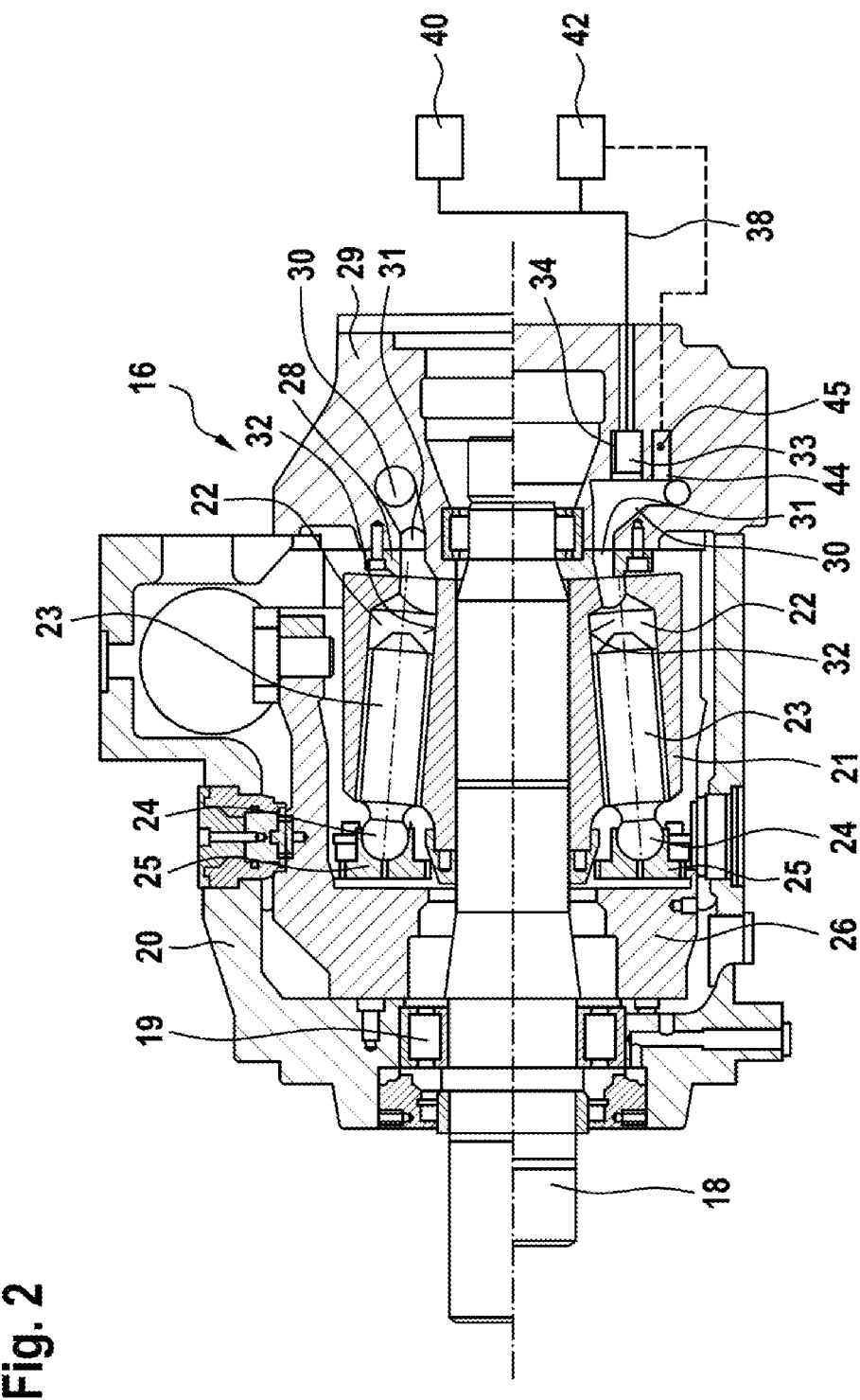
FIG. 2 shows a sectional image of an axial piston machine with a camera.

FIG. 2 illustrates a longitudinal section of an axial piston machine 16, which is a hydraulic component. A drive shaft 18 of the axial piston machine 16 is mounted for rotation via a rolling bearing 19 in a housing 20 of the axial piston machine 16. A cylindrical drum 21 is connected to the drive shaft 18 for conjoint rotation. Cylinder holes 22 are formed in the cylindrical drum 21 offset on a pitch circle. In each case a piston 23 is arranged in said cylinder holes 22 so as to be axially displaceable. A respective piston 23 is connected to a slide shoe 25 via a ball-and-socket joint 24 and is supported via said slide shoe 25 at a cradle 26. A connection of the cylinder holes 22 to a high-pressure side (not illustrated) of the axial piston machine 16 and a low-pressure side (likewise not illustrated) is implemented via a control plate 28. A travel of the pistons 23 in the cylinder holes 22 is specified by a pivot angle of the cradle 26. According to FIG. 2, the cradle 26 is shown in its minimally pivotable state.

A connection cover 29, which can connect the axial piston machine 16 to a hydraulic system, which is not illustrated here, is connected to the control plate 28. The connection cover 29 has openings 30 that are connected to the cylinder holes 22 via openings 31 in the control plate 28. The openings 30 are inlet and/or outlet openings, for example. The cylinder holes 22 have sliding surfaces 32 on which the pistons 23 that can become worn on account of cavitation, for example, slide, and it is therefore advantageous to monitor them via a camera 33. The camera 33 is placed in a cutout 34, which, during production, has a connection to the opening 30. Using the camera 33, which in this case is aligned parallel to an axial axis of the axial piston machine 16, the sliding surfaces 31 of the cylinder holes 22 can be observable through the opening 30 and via the openings 31 in the control plate 28.

The cutout 34 has two portions with different diameters. A first portion of the cutout 34 has a diameter such that the camera 33 is arrangeable therein. The camera 33 can be insertable into the cutout 34 for example through the opening 30. A cable 38, by means of which the camera 33 is connectable to a power source and/or an evaluation unit 40 and/or a computation unit 42, can be guided from the camera 33 to the outside through the cutout 34. Since the camera 33 is insertable through the opening 30, a portion of the cutout 34 through which the cable 38 is guided can have a smaller diameter than the portion in which the camera 33 is arranged. As a result, the cutout 34 can be easily sealed off with respect to the outside at the portion with the smaller diameter.

The connection cover 29 additionally has a further cutout 44, in which a light source 45 is arrangeable. Like the camera 33, the light source 45 can be mountable through the opening 30. The light source 45 can have a battery and/or a rechargeable battery and be connected to for example the computation element 42 via Bluetooth or another cable-free connection feature, for example. The computation element 42 can control the camera 33 and the light source 45 for example synchronously with the movement of the axial piston machine 16.

Figure 3:
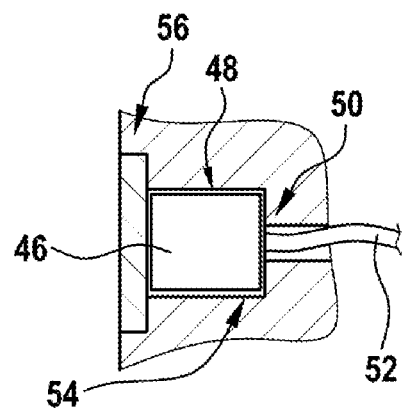
FIG. 3 shows a schematic drawing of a camera in an installed state.

FIG. 3 shows an exemplary portion, for example of the connection cover 34 of FIG. 2, in which a camera 46 is integrated. The camera 46 is integrated in a cutout 48. The cutout 48 has three stepped portions, wherein a first portion 50 has the smallest diameter because it is suitable for guiding a cable 52 through. In a second portion 54, which has a diameter such that the camera 46 is able to be integrated therein, the camera 46 is placed. The cutout furthermore has a third portion 56, which has a somewhat larger diameter than the portion 54. The camera 46 is able to be inserted into the cutout 48 through the portion 56, which preferably faces the edge that is prone to wear and/or the surface that is prone to wear. When the camera 46 has been inserted, the cutout 48 can be closed off with a pane and/or a transparent element 58 on the side that faces the edge that is prone to wear and/or the surface that is prone to wear. A sealant, for example a seal, can be arranged around the element 58 to protect the camera 46 against hydraulic fluid and/or dirt. Furthermore, a seal or a sealant preventing the hydraulic fluid from passing through the cutout 48 to the outside can also be arranged around the cable 52.

Figure 4:
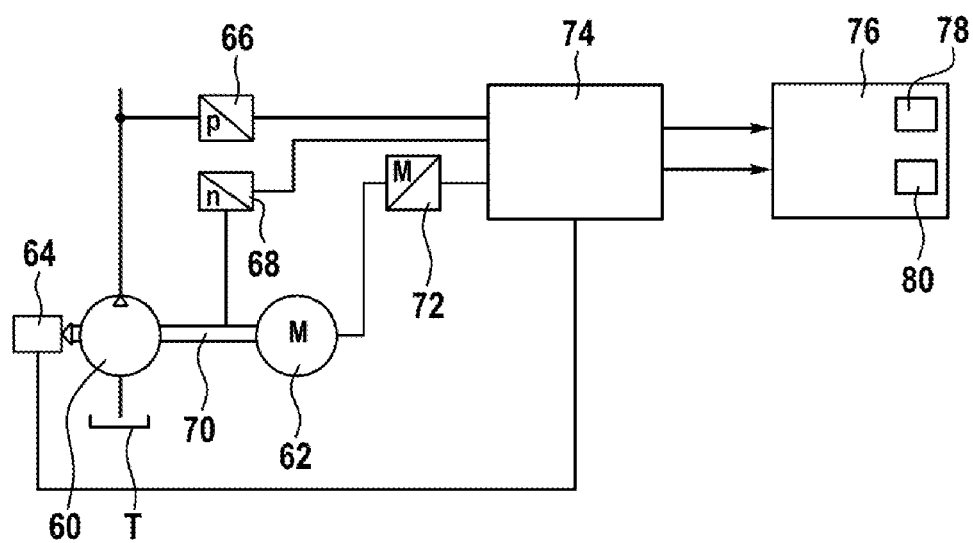
FIG. 4 shows a schematic construction of a hydraulic component with an evaluation unit.

FIG. 4 shows a schematic construction of a hydraulic component that is a hydraulic machine 60 driven by a motor 62. The hydraulic machine 60 sucks in hydraulic fluid from a tank T. A camera 64 is integrated in the hydraulic machine 60 to observe a surface that is prone to wear and/or an edge that is prone to wear (not illustrated here). Furthermore, a plurality of operating data are tapped off by various sensors. For example, a pressure sensor 66 is provided, which picks up pressure in a pressure line on the output side of the hydraulic machine 60. Furthermore, a speed sensor 68 is provided, which taps off a rotational speed of a drive shaft 70 of the motor 62 and measures the number of revolutions per minute with which the drive shaft 70 rotates to drive the hydraulic machine 60. In addition, a torque that the motor 62 delivers for driving the hydraulic machine 60 is also measured with a torque sensor 72.

Both image data recorded by the camera 64 and the operating data are transmitted either without a cable and/or with a cable to a component 74, which is in particular a gateway and/or a server that connects the system of the hydraulic machine 60 preferably to an evaluation unit 76. In the evaluation unit 76, the data, i.e. the images and/or the operating data, can be evaluated by the evaluation unit 76. In addition, the evaluation unit can have an automated image-evaluating unit 78 that evaluates the images of the camera 64 by way of a neural network. The evaluation unit 76 can additionally contain a screen 80 via which for example a person can evaluate the images and operating data.

Figure 5:
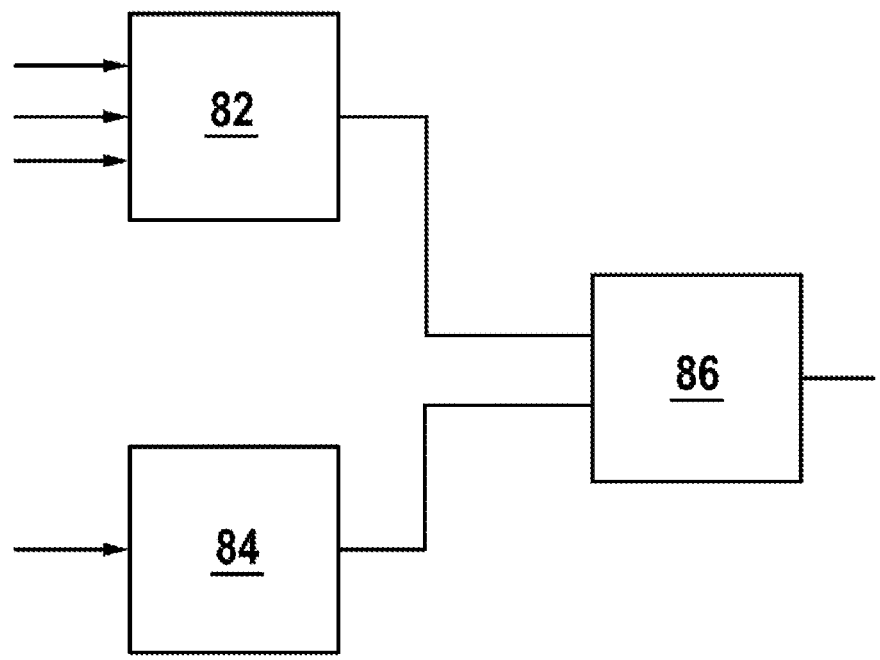
FIG. 5 shows a sequence of an evaluation of an evaluation unit.

FIG. 5 shows a sequence that describes schematically how the evaluation unit 76 of FIG. 4 evaluates the images and/or the operating data. First, in a first step 82, the operating data such as pressure, rotational speed, and torque, which were measured for example in FIG. 4 using a pressure sensor 66, a speed sensor 68, and a torque sensor 72, are processed. That is to say, a statement about wear is derived from the operating data. In a further step 84, which is able to be performed in particular simultaneously with or parallel to step 82, the images of the camera 64 are likewise evaluated, in particular by way of a neural network of the automated image evaluation unit 78 of FIG. 4, and a statement about wear is likewise made. Both statements about wear are then compared to one another in a step 86.

That is to say, the evaluation unit compares the statement about wear that is based on the operating data to the statement about wear that is based on the images of the camera. If these match, for example, and both statements about wear are negative, i.e. no wear was found, for example a green light can be displayed on a screen 80 of FIG. 4. If both statements about wear are positive, i.e. both statements about wear indicate that wear was found, for example a red light and/or a notification can be output to a person. If the statements about wear differ, a notification can likewise be output to a person, indicating that that person can check for example the images of the camera 64 and thus ascertain whether wear is present.

LIST OF REFERENCE SIGNS 1 directional valve
2 Pilot valve
4 Valve slide
6 Valve body
8 Spring
10 Control edge
12, 33, 46, 64 Camera
14, 34, 44, 48 Cutout
15, 38, 52 Cable
16 Axial piston machine
18 Drive shaft
19 Rolling bearing
20 Housing
21 Cylindrical drum
22 Cylinder hole
23 Piston
24 Ball-and-socket joint
35 Slide shoe
26 Cradle
28 Control plate
29 Connection cover
30 Openings
31 Sliding surfaces
40 Evaluation unit
42 Computation unit
45 Light source
50, 54, 56 Portion
58 Transparent/transmissive element
60 Hydraulic machine
62 Motor
66 Pressure sensor
68 Speed sensor
70 Drive shaft
72 Torque sensor
74 Gateway
76 Evaluation unit
78 Automated image evaluation unit
80 Screen
82, 84, 86 Step

The invention claimed is:
1. A hydraulic component comprising:
at least one camera integrated in the hydraulic component, the at least one camera configured such that al at least one surface that is prone to wear and is located within a housing of the hydraulic component is observable using the camera and/or (ii) at least one edge that is prone to wear and is located within the housing is observable using the camera.

2. The hydraulic component according to claim 1, further comprising:
an evaluation unit configured to evaluate an image of the camera and to make a first statement about wear relating to the at least one surface and/or the at least one edge.

3. The hydraulic component according to claim 2, wherein the evaluation unit includes and/or is connected to a screen so as to enable data from the evaluation unit to be evaluated by a person.

4. The hydraulic component according to claim 2, wherein the evaluation unit includes an automated image evaluation unit.

5. The hydraulic component according to claim 2, further comprising:
at least one sensor configured to determine operating data of the hydraulic component,
wherein the evaluation unit is configured to effect a second statement about wear relating to the hydraulic component based on the operating data.

6. The hydraulic component according to claim 5, wherein the evaluation unit is configured to compare the second statement about wear that is based on the operating data to the first statement about wear that is based on the image.

7. The hydraulic component according to claim 1, wherein at least one of the hydraulic component and the camera includes at least one light source that illuminates the at least one edge and/or the at least one surface within the housing.

8. The hydraulic component according to claim 7, further comprising:
at least one cutout formed in the housing, the at least one cutout configured to accommodate at least one of the camera and the light source.

9. A hydraulic component, comprising:
at least one camera integrated in the hydraulic component, the at least one camera arranged such that at least one surface that is prone to wear and/or at least one edge that is prone to wear is observable using the camera; and
a computation element configured to control a light source and/or the camera in dependence on operating data of the hydraulic component determined by a sensor.

10. The hydraulic component according to claim 7, wherein the light source is a stroboscope.

11. The hydraulic component according to claim 1, wherein at least one of the hydraulic component and the camera includes a transparent/transmissive element configured to protect at least one of the camera and a light source from dirt.

12. The hydraulic component according to claim 1, wherein the hydraulic component is one of an axial piston machine, a directional valve, a control valve, a servo hydraulic axis, a hydraulic cylinder, a piston accumulator, and an assembly.

13. A hydraulic component, comprising:
at least one camera integrated in the hydraulic component, the at least one camera arranged such that at least one surface that is prone to wear and/or at least one edge that is prone to wear is observable using the camera,
wherein the hydraulic component is a directional valve, and
wherein the camera is arranged in a valve body, such that a control edge is observable using the camera.

14. The hydraulic component according to claim 12, wherein the hydraulic component is an axial piston machine, and the camera is arranged in a connection cover such that a sliding surface is observable.

15. The hydraulic component according to claim 14, wherein the hydraulic component is an axial piston machine, and the camera is arranged in at least one of an inlet channel and an outlet channel in the connection cover.

16. The hydraulic component according to claim 13, further comprising:
an evaluation unit configured to evaluate an image of the camera and to make a first statement about wear relating to the at least one surface and/or the at least one edge.

17. The hydraulic component according to claim 16, wherein the evaluation unit includes and/or is connected to a screen so as to enable data to be evaluated by a person.

18. The hydraulic component according to claim 16, wherein the evaluation unit includes an automated image evaluation unit.

19. The hydraulic component according to claim 16, further comprising:
at least one sensor configured to determine operating data of the hydraulic component,
wherein the evaluation unit is configured to effect a second statement about wear relating to the hydraulic component based on the operating data.

20. The hydraulic component according to claim 19, wherein the evaluation unit is configured to compare the second statement about wear that is based on the operating data to the first statement about wear that is based on the image.

* * * * *

UNITED STATES PATENT AND TRADEMARK OFFICE
CERTIFICATE OF CORRECTION

PATENT NO. : 11,274,686 B2
APPLICATION NO. : 16/927646
DATED : March 15, 2022
INVENTOR(S) : Fuchs It is certified that error appears in the above-identified patent and that said Letters Patent is hereby corrected as shown below:

In the Claims

In Claim 1, at Column 8, Lines 62-63: "al at least one surface" should read --(i) at least one surface--.

Signed and Sealed this
Fifth Day of July, 2022

Katherine Kelly Vidal
*Director of the United States Patent and Trademark Office*